Nov. 2, 1937.  W. J. FIEGEL  2,097,691

METHOD AND MACHINE FOR FORMING FLANGED BEARING SHELLS

Filed March 23, 1936   5 Sheets-Sheet 1

INVENTOR
WILLIAM J. FIEGEL
BY *Whittemore Hulbert*
*Whittemore & Belknap*
ATTORNEYS

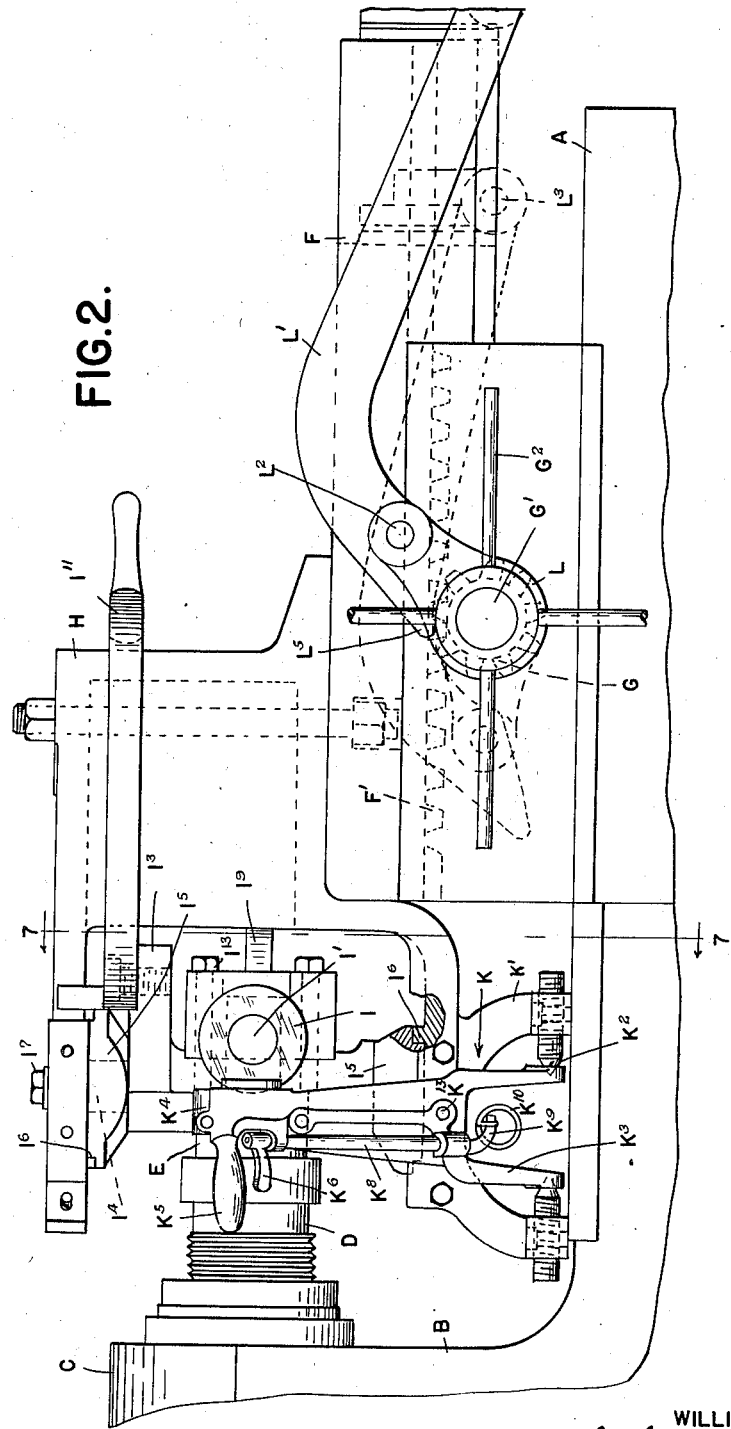

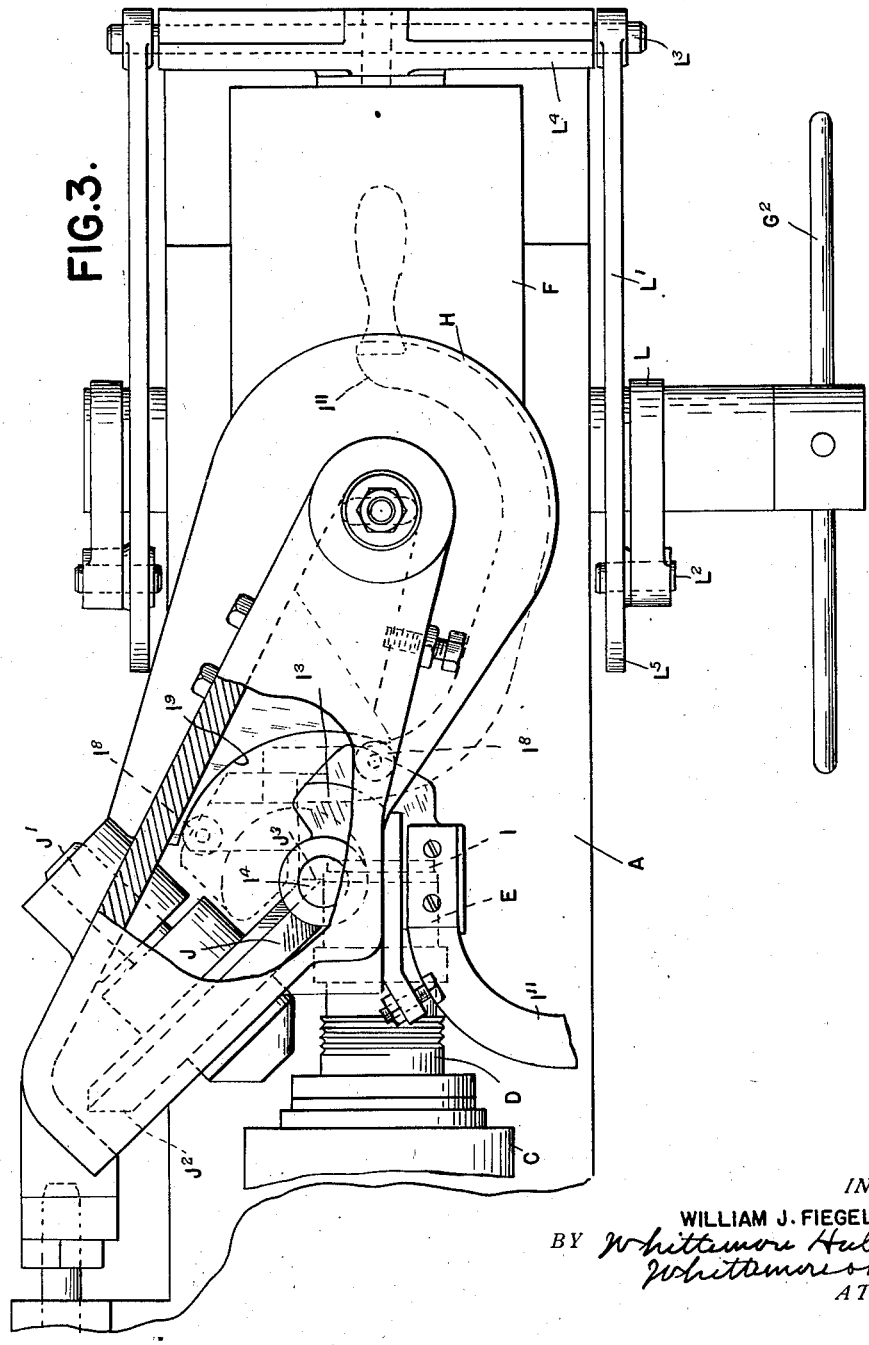

Nov. 2, 1937. W. J. FIEGEL 2,097,691
METHOD AND MACHINE FOR FORMING FLANGED BEARING SHELLS
Filed March 23, 1936 5 Sheets-Sheet 4

INVENTOR
WILLIAM J. FIEGEL
BY
ATTORNEYS

Nov. 2, 1937. W. J. FIEGEL 2,097,691
METHOD AND MACHINE FOR FORMING FLANGED BEARING SHELLS
Filed March 23, 1936 5 Sheets-Sheet 5
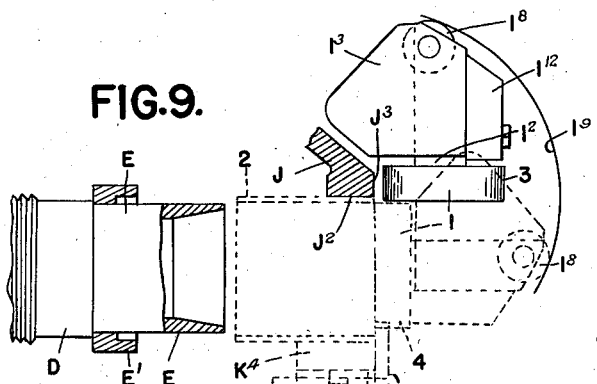
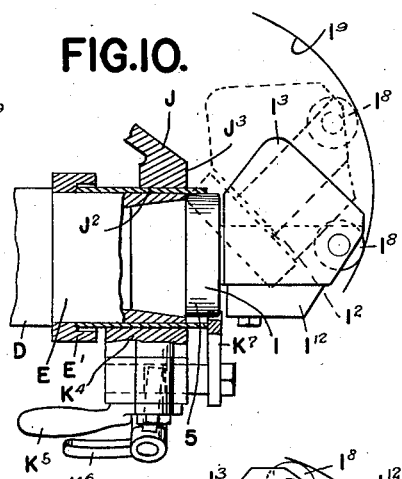
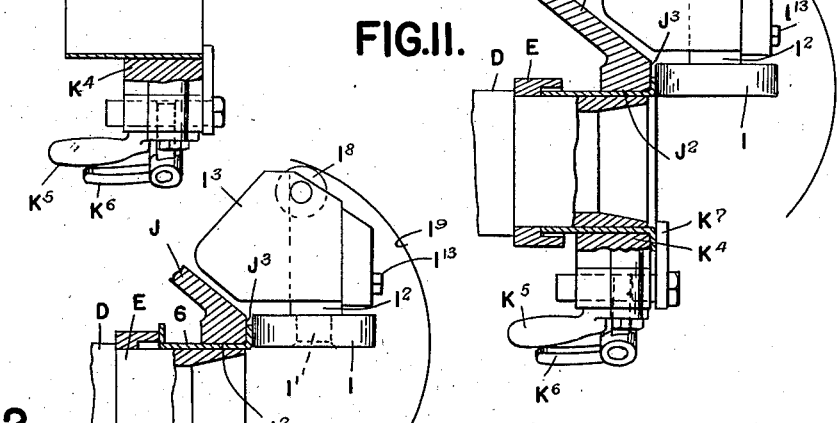
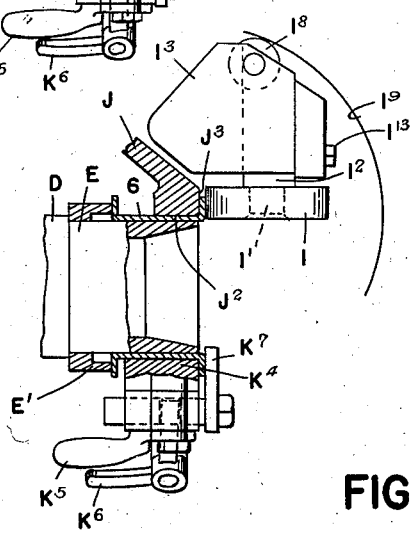
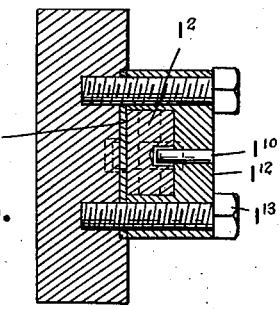
INVENTOR
WILLIAM. J. FIEGEL
BY
ATTORNEYS Patented Nov. 2, 1937

2,097,691

UNITED STATES PATENT OFFICE 2,097,691

METHOD AND MACHINE FOR FORMING FLANGED BEARING SHELLS

William J. Fiegel, Detroit, Mich., assignor to Bohn Aluminum & Brass Corporation, Detroit, Mich., a corporation of Michigan Application March 23, 1936, Serial No. 70,445

20 Claims. (Cl. 153—29)

The invention relates to the manufacture of bearing shells of that type comprising a cylindrical or segmental cylindrical portion and a flange extending radially outwardly at one or both ends thereof. It is the object of the invention to form said shells from cylindrical blanks by expanding and turning an end portion thereof to form the flange and to accomplish this purpose without danger of splitting or otherwise injuriously stressing the metal. It is a further object to form this flange without distortion of the cylindrical portion of the blank adjacent thereto maintaining a substantially uniform gage or thickness of metal in both cylindrical portion and flange. Still another object is to form this flange with a substantially square corner between the same and the outer surface of the cylindrical portion. With these and other objects in view, the invention consists: first, in the novel method of forming the flange; and second, in the mechanism employed for carrying out this method as hereinafter set forth:

In the drawings:

Figure 2 is a side elevation thereof;

Figure 3 is a plan view thereof;

Figure 8 is a section on line 8—8 of Figure 4;

Figures 9, 10, 11 and 12 are diagrams showing the successive operations in the flanging of the blanks.

Figure 1:
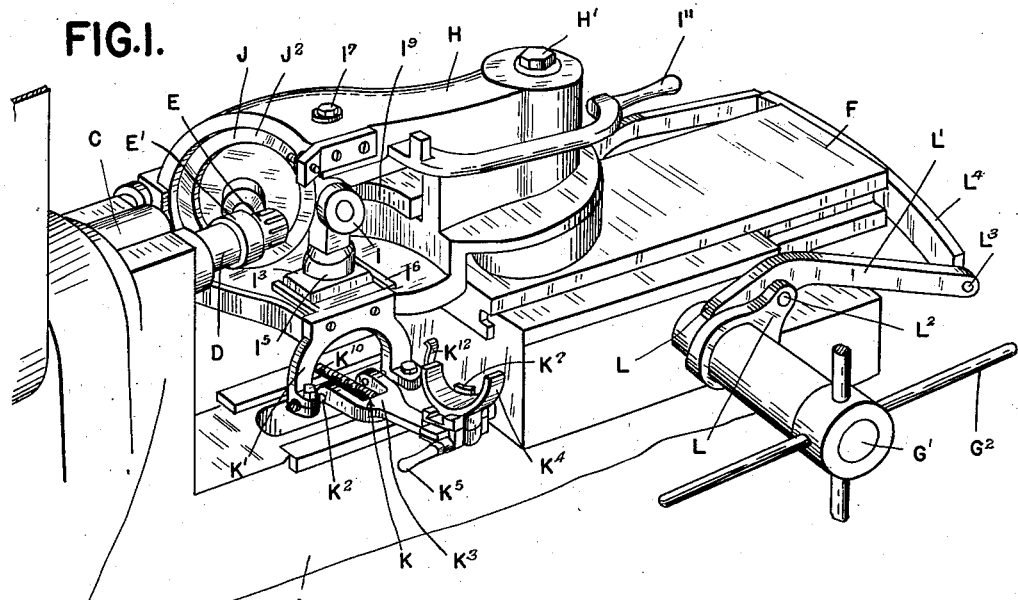
Figure 1 is a perspective view of the machine.
Figure 4:
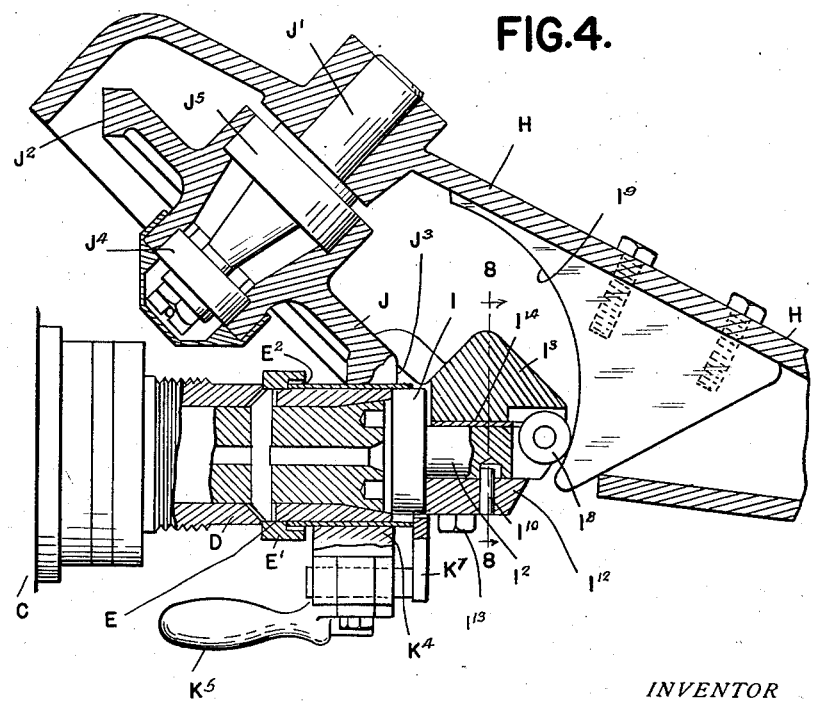
Figures 4, 5 and 6 are horizontal sections in the plane of the axis of the spindle showing different positions of adjustment during the forming of a flange.
Figure 5:
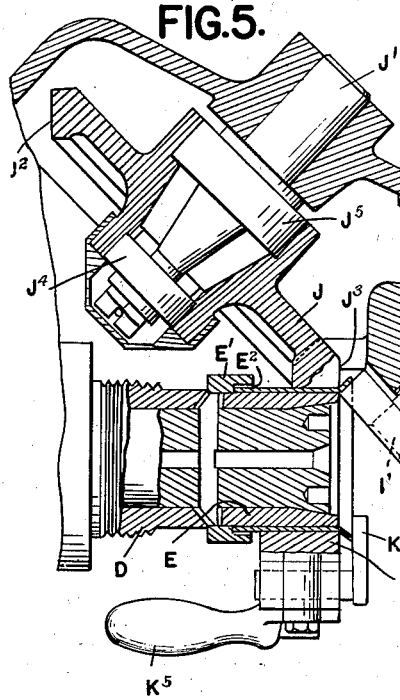
Figure 6:
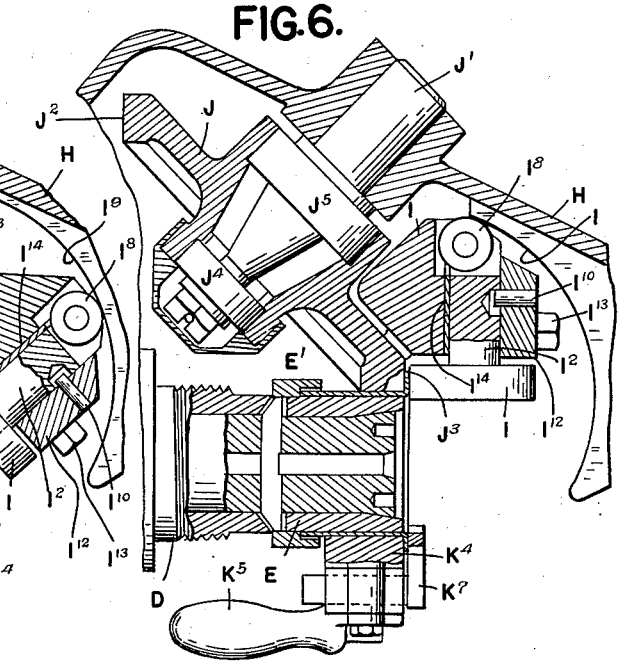
Figure 7:
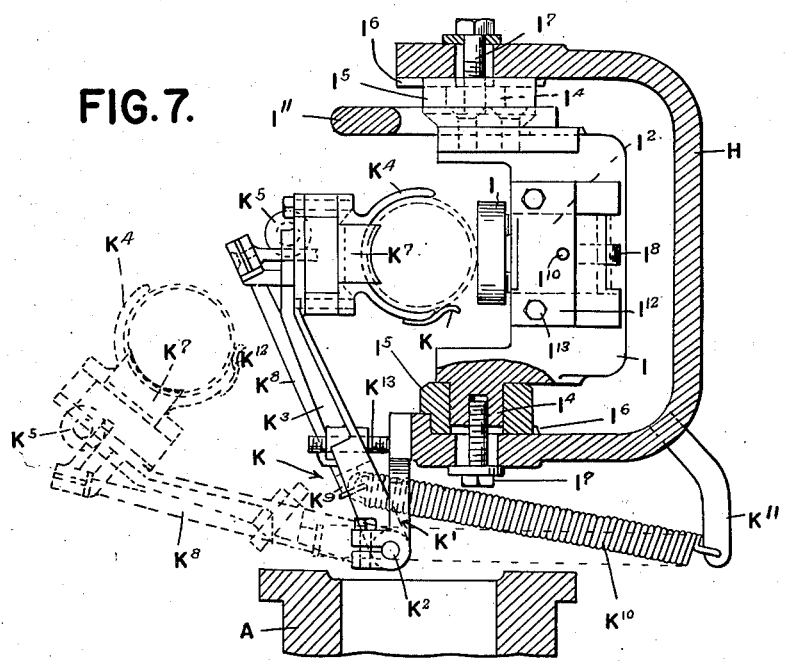
Figure 7 is a cross-section on line 7—7 of Figure 2.

In carrying out my improved method I first cut tubing, preferably seamless steel tubing, to suitable lengths so as to provide metal for both the cylindrical portion of the shell and the flange or flanges formed thereon. These blanks are then engaged with a rotatable chuck or collet adapted to hold a portion thereof from distortion while leaving a free projecting end portion. The flange is then turned from this free end portion by the pressure of a roller which initially has its axis parallel to the axis of the chuck and with its periphery in engagement with the inner surface of the blank, said roller being then swung about an axis substantially tangent to the outer surface of the blank at a point between the held and free portions. Provision is also made for holding the portion of the tube engaged by the collet from outward expansion and for forming a square shouldered abutment against which the flange can be pressed. This will result in the forming of the substantially square flange previously referred to. However, there are further difficulties encountered due: first, to the fact that the radially outwardly directed force of the expanding roll may overstress the metal circumferentially and cause the development of radial splitting; second, the increased circumferential length of the outer portions of the flange tend to thin the gage of the metal so as to form a tapering cross-section; third, the roller in swinging about the tangent axis is withdrawn from contact with a portion of the flange at the bend permitting distortion to occur in this portion. These difficulties have been solved by flowing the metal axially of the original blank or radially of the flange and to an extent that will compensate for the increased peripheral length maintaining substantially the same volume and same thickness of metal in the flange as in the free portion of the cylindrical blank from which it is formed. In other words, the axial dimension of the free portion of the blank is greater than the radial dimension of the finished flange, so that with the exception of slight differences due to increased density in the worked metal, the volume of the flange is equal to the volume of said free portion of the blank. This flowing of the metal I preferably accomplish by a positive movement of the expanding roll axially thereof at the same time that it is swinging about the tangent axis.

My improved machine for carrying out the process above described comprises essentially a rotary chuck or collet for engaging the inner surface of the tubular blank leaving a projecting free portion from which the flange is to be formed. There is also a roller for engaging the inner surface of the projecting portion adjacent to the portion clamped by the collet. This roller is carried by a swinging frame, the axis of which extends substantially tangent to the outer surface of the tubular blank intermediate the portion clamped by the collet and said roller. The mechanism is further provided with an abutment preferably a roller which bears against the portion of the outer surface of the tubular blank held by the collet and with a right angle face against which the flange is pressed, thus insuring a square corner between the flange and cylindrical portion. There is also provided means for moving the roller axially for the purpose previously described, and finally adjustment means which adapts the machine for operating upon cylindrical blanks of different diameters.

As specifically shown A is a bed or frame having extending upward therefrom the post B carrying at its upper end a bearing C for a rotary spindle D. This spindle projects outward from the post and has mounted at its outer end an internal chuck or collect E for holding the tubes to be operated upon. Slidably mounted on the bed A in alignment with the axis of the spindle D is a carriage F. This is provided on its underside with a rack F' which is engaged by a pinion G on a rotary shaft G' journaled in the bed. The outer end of this shaft is provided with operating handles $G^2$ by means of which the pinion may be revolved to advance or retract the carriage F.

Mounted upon the carriage F is a frame member H which carries the forming rolls, the swinging roll holder and other parts of the operating mechanism. The roller I which performs the turning of the flange is exchangeably mounted upon a roller axle I' which in turn is mounted on a shank $I^2$ slidably engaging bearings in a swinging member $I^3$. The member $I^3$ has trunnions $I^4$ at its upper and lower ends which engage bearings $I^5$ mounted on the frame H. To this end, the frame H is of a U-shaped cross-section and the member $I^3$ is located between the upper and lower portions thereof. The bearings $I^5$ are also adjustable in position in transverse guides $I^6$ and are secured by tap screws $I^7$ passing through slots in the frame H. For a reason hereinafter explained, it is desirable that the roller I should move axially at the same time that the member $I^3$ is swung on its trunnions $I^4$. To accomplish this the shank $I^2$ has arranged at its rear end a roller $I^8$ which travels on an arcuate cam track $I^9$ mounted on the frame H. This track is slightly eccentric to the axis of the trunnions so that during the swinging of the member $I^3$ the shank $I^2$ will slide in its bearings and the roller I will be correspondingly moved axially. A pin $I^{10}$ in the bearing projecting into a slot in the shank $I^2$ permits of this movement but holds the shank from accidental disengagement from its bearing.

To hold the cylindrical part of the bearing shell from distortion during the bending of the flange and also to form an abutting surface against which the flange is pressed, there is provided a roller J. This is journaled on a spindle J', the axis of which preferably extends at an angle of 45 degrees to the axis of the spindle D. The spindle J' is secured to the frame H and is so located that a beveled peripheral face $J^2$ of the roller J will bear against the outer cylindrical surface of the tube engaged with the chuck E. The roller J also has a second peripheral face $J^3$ which is at right angles to the face $J^2$ and forms an abutment against which the flange is turned. The roller J preferably has anti-friction roller bearings $J^4$, $J^5$ for engaging the spindle J' so as to reduce the friction of turning.

For engaging the tube with the chuck E I preferably provide a transfer carrier in which the tubular blank is first placed and which will convey the same into axial alignment with the spindle D. This transfer carrier K is also mounted on the frame H which is provided with a depending bifurcated bracket K' having centers $K^2$ carried by the furcations thereof. Engaged with these centers is a swinging arm $K^3$ having mounted on its free end a segmental support $K^4$ for the tubular blank. A handle $K^5$ extends from the arm $K^3$ for actuating the same and a bell crank lever $K^6$ adjacent to this handle and pivotally supported thereon actuates a member $K^7$ for bearing against the end of the tubular blank. The bell crank lever $K^6$ is mounted on a rockshaft $K^8$ extending parallel to the arm $K^3$ and at its lower end having a rockarm $K^9$ attached to a spring $K^{10}$, the opposite end of which is anchored to an arm $K^{11}$ on the frame H. The arrangement is such that the arm $K^{11}$ may be swung by the handle $K^5$ and when extending in a horizontal position a tubular blank may be inserted in the segmental support $K^4$. A spring clip $K^{12}$ on this segment serves to retain the tube in engagement with the same. Prior to engaging the tube with the segment the operator actuates the bell crank lever $K^6$ to move the member $K^7$ outward and after engagement of the tube with the segment this bell crank lever is released, whereupon the tension of the spring $K^{10}$ will actuate the rockshaft $K^8$ and bell crank lever $K^6$ moving the member $K^7$ inward and thereby axially adjusting the tubular blank to a predetermined position. The arm $K^3$ is then swung upward to a position determined by an adjustable stop $K^{13}$ in which position the tubular blank is axially aligned with the spindle D. However, as this transfer mechanism is mounted upon the frame H which is upon the carriage F and as the latter is in its outer position of adjustment the tubular blank will not interfere with the chuck E but will be arranged in alignment therewith.

The chuck E may be of any suitable construction either mechanically operated or actuated by fluid pressure. In contracted position the tubular blank may be freely sleeved over the chuck and upon expanding the jaws thereof, it will be held to rotate with the spindle. The blank is positioned on the chuck by a stop collar E' which is so arranged that when a blank of suitable length has its inner end in engagement with this stop, its outer end portion will project sufficiently beyond the end of the chuck to provide metal for forming the flange. The stop collar E' is further provided with an annular portion $E^2$ projecting forward outside of the tubular blank to form another stop for engagement with a flanged end of the blank. This portion $E^2$ is spaced from the shoulder on the portion E' a sufficient distance so that when the blank is reversed after the forming of a flange on one end thereof its opposite end will project beyond the end of the chuck the proper distance for forming a second flange. The sequence of operations in forming the flange blank are diagrammatically illustrated in Figures 9 to 12 inclusive and are as follows:

A tube section cut to a predetermined length is first placed in engagement with the segmental holder $K^4$ as indicated at 1, Figure 9, and the bell crank lever $K^6$ is operated to properly position the end of this blank in said holder. The arm $K^3$ is then swung upon the centers $K^2$ from the position shown in full lines in Figure 9, to the position where the tubular blank is in axial alignment with the spindle D but clears the end of the chuck E, this being shown in dotted lines at 2, Figure 9. During this operation the roller I is in the position shown at 3, Figure 9 where it also is out of the path of the transferred blank. This roller is then moved into axial alignment with the spindle D by the swinging of the member $I^3$ on the trunnions $I^4$ which is accomplished by a lever $I^{11}$ the position being as shown in dotted lines at 4, Figure 9. The next operation is the movement of the carriage F by the rotation of the pinion G through the medium of the shaft G' and handle $G^2$. This will carry the holder $K^4$ towards the chuck sleeving the tubular blank around the jaws thereof and continuing the movement until the end of the tubular blank engages the stop E'. A further movement of the carriage will move the roller I into the projecting end portion of the blank which latter together with the member K⁷ remains stationary during this further movement. This will bring the parts in position for performing the flanging operation, as shown in full lines at 5, Figure 10. The chuck is then operated to expand the jaws to engage the tube and to impart rotary motion thereto. The member I³ is then again moved by the lever I¹¹ which presses it outward expanding the diameter of the projecting portion of the tubular blank and gradually turning the same until it extends in a plane at right angles to the axis of the spindle D. During this operation the roller J, the beveled face J² of which is in contact with the cylindrical portion of the blank, will hold this portion from distortion and will provide a sharp corner around which the flange is bent, as shown in dotted lines Figure 10 and in full lines in Figure 11. The chuck is next released the carriage F moved rearward to disengage the tubular blank from the chuck after which it is swung outward by the member K³ is reversed in position in the holder K⁴ and is returned in alignment with the spindle D. The carriage F is then again moved forward moving the blank on the chuck until the flange is stopped by the collar E² after which the chuck is again expanded and the operations repeated to form a flange on the opposite end of the blank, as shown at 6, Figure 12.

In turning a portion of a tube to form a radially outwardly projecting flange the circumferential length is increased with a tendency to correspondingly decrease the cross section. This would result in making the flanges of the shell of lesser thickness than the cylindrical portion which would be undesirable. To avoid this tendency the projecting portion of the tubular blank from which the flange is to be formed is of greater length than the radial width of the flange. I have also provided the means heretofore described of moving the roller I axially at the same time that it is swung around by movement of the member I³. This axial movement corresponds to the decrease in radial width of the flange over the axial length of the projecting portion of the tube from which it is formed. Consequently, the thickness of this flange will remain constant with the thickness of the tube. This, as before described, is accomplished by arranging the track I⁹ slightly eccentric to the axis of the trunnions J⁴ which will cause the axial movement of the roller I as just described.

As has been stated, the machine is adapted to perform its work on tubular blanks varying in diameter and also in the thickness of the metal wall. Where a tube of larger or smaller diameter is to be operated upon, it is necessary to exchange the roller I for one corresponding to the diameter of the tube. This would change the relation of the periphery of the roller to the axis of turning, but such result is avoided by an adjustment of the bearing in which the shank I² slides. As shown, this bearing is formed in a detachable cap I¹² secured to the member I³ by screws I¹³ and a shim I¹⁴ is placed intermediate this cap and the member I³. This shim may be exchanged for one of greater or lesser thickness and in this way adjustment can be made to place the periphery of the roll substantially tangent to the axis around which the member I³ turns. The same means may be employed for compensating for different thicknesses of metal in the tubular blank as it is desirable to have the axis of turning tangent to the outer surface of the tube while the periphery of the roller I engages the inner surface of the tube. It may also be necessary to adjust the bearings I⁵ by releasing the tap screws I⁷ moving said bearings on the guides I⁶.

When the carriage F is moved forward to bring the rollers I and J in operative relation to the work, it is necessary to lock it in this position during the performance of the bending operation. This may be accomplished by the construction shown in which L is a crank arm on the shaft G', and L' is a link pivotally connected at L² to the crank and having its opposite end pivotally connected at L³ to an arm L⁴ secured to the carriage F. A forward projection L⁵ of the link L' normally engages a shaft G' and limits the rearward movement of the carriage F. Forward movement is limited as indicated in dotted lines, Figure 2, by engagement of the rear portion of the link L' with the shaft G' and in this position the crank has turned beyond the dead center so as to lock the carriage from rearward movement under any stress directly applied thereto. This will insure that the bending of the flange will be properly performed.

What I claim as my invention is:

1. The method of forming flanged bearing shells comprising, holding a portion of a cylindrical blank from distortion leaving a projecting free portion, engaging the projecting free portion of said blank with a roller, relatively rotating said blank and roller, simultaneously swinging said roller about an axis substantially tangent to said blank at a point intermediate the held and free portions thereof, and positively flowing the metal in a direction axial with respect to the original blank and radial with respect to the formed flange to compensate for the changed peripheral length and to maintain substantial uniformity in thickness.

2. The method of forming flanged bearing shells comprising, holding a portion of a cylindrical blank from distortion leaving a projecting free portion, engaging the projecting free portion of said blank with a roller, relatively rotating said blank and roller, simultaneously swinging said roller about an axis substantially tangent to said blank at a point intermediate the held and free portions thereof, and also moving said roller axially during its swinging movement to positively flow the metal in a direction axial with respect to the original blank and radial with respect to the formed flange thereby maintaining substantial uniformity of thickness.

3. In a machine for flanging tubing, the combination with a rotary chuck for holding a portion of a cylindrical tube section concentric with the axis thereof leaving a free projecting portion, a roller for engaging the inner surface of said projecting portion, means for swinging said roller about an axis substantially tangent to said cylindrical tube section at a point intermediate the held and free portions thereof and means for simultaneously moving said roller axially on said swinging means.

4. In a machine for flanging tubing, the combination with a rotary chuck for holding a portion of a cylindrical tube section concentric with the axis thereof leaving a free projecting portion, a roller for engaging the inner surface of said projecting portion, means for swinging said roller about an axis substantially tangent to said cylindrical tube section at a point intermediate the held and free portions thereof, means for simultaneously moving said roller axially on said swinging means, and means cooperating with said rotary chuck for holding from outward movement the portion of said tube which is adjacent to said point of tangency.

5. In a machine for flanging tubing, the combination with a rotary chuck for holding a portion of a cylindrical tube section concentric with the axis thereof for engaging the inner surface of said projecting portion, means for swinging said roller about an axis substantially tangent to said cylindrical tube section at a point intermediate the held and free portions thereof, means for simultaneously moving said roller axially on said swinging means, and means cooperating with said rotary chuck for holding from outward movement the portion of said tube which is adjacent to said point of tangency, said cooperating means also constituting an abutment for the turned flange.

6. In a machine for flanging tubing, the combination with a rotary chuck for internally engaging a portion of a cylindrical tube section leaving a projecting free portion, of means engaging the outer surface of the tube opposite the portion engaged by said chuck, a roller for engaging the inner surface of the free portion of said tube, means for swinging said roller about an axis tangent to the surface of said tube at a point between said chuck and roller to turn said free projecting portion into a radial flange, and means for moving said roller axially during its swinging movement to flow the metal in said turned portion and to limit the peripheral diameter of the flange.

7. In a machine for flanging tubing, the combination with a rotary chuck for holding a cylindrical tube section concentric with the axis thereof, a pair of rollers engaging longitudinally adjacent portions of said tube respectively inside and outside thereof, means for swinging the axis of one of said rolls relative to the rotational axis of the tube about a transverse axis intermediate said rolls and substantially tangent to the tube, and means for simultaneously moving said roller axially on said swinging means.

8. In a machine for flanging tubing, the combination with a rotary chuck for holding a cylindrical tube section concentric with the axis thereof, a pair of rollers tangent to longitudinally adjacent portions of said tube respectively inside and outside thereof, means for swinging the axis of one of said rolls to a position substantially perpendicular to the axis of said tube and about a transverse axis substantially tangent to said tube at a point intermediate said rolls, and means for simultaneously moving said roller axially on said swinging means.

9. In a machine for flanging tubing, the combination with a rotary chuck for holding a cylindrical tube section concentric with the axis thereof, of a roller for engaging the inner surface of an end portion of said tube, a roller for engaging the outer surface of a portion of said tube longitudinally adjacent to said end portion, a member in which said inner roller is journaled movable about a transverse axis substantially tangent to the surface of said tube at a point intermediate the engagement of said inner and outer rolls, and means for simultaneously moving said roller axially on said member.

10. In a machine for flanging tubing, the combination with a rotary chuck for holding a cylindrical tube section concentric with the axis thereof, of a roller for engaging the inner surface of an end portion of said tube, a roller for engaging the outer surface of a portion of said tube longitudinally adjacent to said end portion, a member in which said inner roller is journaled movable about a transverse axis substantially tangent to the surface of said tube at a point intermediate the engagement of said inner and outer rolls, and means for moving said roller axially during the swinging movement thereof.

11. In a machine for flanging tubing, the combination with a rotary chuck for holding a cylindrical tube section concentric with the axis thereof, of a roller for engaging the inner surface of an end portion of said tube, a roller for engaging the outer surface of a portion of said tube longitudinally adjacent to said end portion, a member in which said inner roller is journaled movable about a transverse axis substantially tangent to the surface of said tube at a point intermediate the engagement of said inner and outer rolls whereby a flange is turned to extend radially outward from said tube, and means for axially moving said roll in a direction radially inward of said flange to maintain a uniform thickness of the latter.

12. In a machine for flanging tubing, the combination with a rotary chuck for holding a cylindrical tube section concentric with the axis thereof, of a roller for engaging the inner surface of an end portion of said tube which end portion is greater in length than the radial length of the finished flange and which is of a mass substantially equal to that of said flange, a roll engaging a portion of the outer surface of said tube longitudinally adjacent to said end portion, means for swinging the axis of the inner roll about a transverse axis substantially tangent to the surface of said tube at a point intermediate the engagement of said rolls, and means for axially moving said roll during the swinging movement thereof in a direction radially inward of said flange to reduce the radial length thereof with respect to the length of said end portion and to thereby maintain a thickness substantially uniform to that of the tube.

13. In a machine for flanging tubing, the combination with a frame or bed, a rotary chuck for holding a cylindrical tube section concentric with the axis thereof said chuck being mounted on said bed, a carriage movable on said bed parallel to the axis of said chuck, a transverse carriage mounted on said first mentioned carriage and adapted to carry a cylindrical blank into alignment with the axis of said chuck, cooperating rolls for engaging longitudinally adjacent portions of said tube respectively inside and outside thereof, said rolls being carried by said first mentioned carriage, means for moving said first mentioned carriage to bring the cylindrical tube on said transverse carriage into engagement with said chuck, a stop for arresting movement of said tube during continued movement of said carriage to engage the inner roll with the end portion of said tube, and means for swinging the axis of said inner roll about a transverse axis substantially tangent to said tube at a point between said inner and outer rolls.

14. In a machine for flanging tubing, the combination with a rotary chuck for holding a cylindrical tube section concentric with the axis thereof, a roller for engaging the inner surface of an end portion of said tube, a roller for engaging the outer surface of a portion of said tube longitudinally adjacent to said end portion, a support on which both of said rollers are mounted, a member carrying said inner roller pivotally engaging said support to swing about a transverse axis, adjustment means for placing said axis substantially tangent to said cylindrical tube section at a point intermediate said inner and outer rollers, means for moving said member to swing the same about said axis from a position where the axis of said inner roller is parallel to the axis of said tube to a transverse position, and means for simultaneously moving said roller axially on said member.

15. In a machine for flanging tubing, the combination with a frame or bed, a rotary chuck for holding a cylindrical tube section concentric with the axis thereof said chuck being mounted on said bed, a carriage movable on said bed parallel to the axis of said chuck, rollers mounted on said carriage one of said rollers engaging the inner surface of a projecting end portion of said tube section and the other of said rollers engaging a longitudinally adjacent portion of the outer surface of said tube section, a member carrying said inner roller adapted to swing about a transverse axis substantially tangent to said tube section intermediate said inner and outer rollers, and adjustment means for changing the positions of said rollers on said carriage to correspond to tube sections of different diameters.

16. In a machine for flanging tubing, the combination with a frame or bed, of a rotary chuck for holding a cylindrical tube section concentric with the axis thereof said chuck being mounted on said bed, a carriage movable on said bed parallel to the axis of said chuck, rollers mounted on said carriage and movable therewith into and out of engagement with said tube section, one of said rollers engaging the outer surface of said tube and the other a longitudinally adjacent portion of the inner surface of said tube, a carrier for one of said rollers adapted to swing about an axis substantially tangent to said tube section intermediate said rollers, and means for adjusting said rollers and carrier on said carriage for engagement with tube sections of different diameters.

17. In a machine for flanging tubing, the combination with a rotary chuck for holding a cylindrical tube section concentric with the axis thereof, of rollers for engaging longitudinally adjacent portions of the inner and outer surfaces of said tube the roller for the inner surface being exchangeable, a carrier for said inner roller adapted to swing about an axis substantially tangent to said tube section at a point intermediate said rollers, means for simultaneously adjusting said rollers and carriers for engagement with tube sections of different diameters, an axle for said exchangeable inner roller, and means for adjusting the axis of said axle on said carrier to maintain the periphery of said inner roller in fixed relation to the axis of turning of said carrier.

18. In a machine for flanging tubing, the combination with a rotary chuck for holding a cylindrical tube section concentric with the axis thereof, of rollers for engaging longitudinally adjacent portions of the inner and outer surfaces of said tube, a carrier for said inner roller adapted to swing about an axis tangent to said tube section at a point intermediate said rollers, means for adjusting said rollers and carrier for engagement with tube sections of different diameters, an axle for said inner roller engageable with rollers of different diameters corresponding to the diameters of the tube sections, a detachable bearing for said axle on said carrier, and a shim between said bearing and carrier for adjusting the axis of said axle to maintain the periphery of the roller in constant relation to the swinging axis of the carrier.

19. In a machine for flanging tubing, the combination with a rotary chuck for holding a cylindrical tube section concentric with the axis thereof, of rollers for engaging longitudinally adjacent portions of the inner and outer surfaces of said tube, said outer roller being arranged in a plane oblique to the axis of said tube section having peripheral portions at right angles to each other one being transverse to the axis of said tube section and the other parallel thereto, and a carrier for said inner roller adapted to swing about an axis tangent to said tube section at a point intermediate said rollers whereby the portion of said tube engaged by said inner roller is deflected by the swinging of said carrier into engagement with the transversely extending peripheral portion of said outer roller.

20. In a machine for flanging tubing, the combination with a frame or bed, of a rotary chuck for holding a cylindrical tube section concentric with the axis thereof said chuck being mounted on said bed, a carriage movable on said bed parallel to the axis of said chuck, a transverse carriage mounted on said first mentioned carriage adapted to carry a cylindrical blank into alignment with the axis of said chuck, cooperating rolls for engaging longitudinally adjacent portions of said tube respectively inside and outside thereof said rolls being carried by said first mentioned carriage, means for moving said first mentioned carriage to bring the cylindrical tube on said transverse carriage into engagement with said chuck, a stop for arresting movement of said tube during the continued movement of said carriage to engage the inner roll with the end portion of said tube, means for swinging the axis of said inner roll about a perpendicular axis substantially tangent to said tube at a point between said inner and outer rolls, and an annular member projecting forward from said stop to surround the tube in engagement therewith, said member constituting a second stop for engaging the formed flange on one end of the tube during the flanging of the other end thereof.

WILLIAM J. FIEGEL.